Feb. 13, 1923.
R. DAAE
GAS PRODUCER
Original Filed Nov. 1, 1919    6 sheets-sheet 5
1,445,300
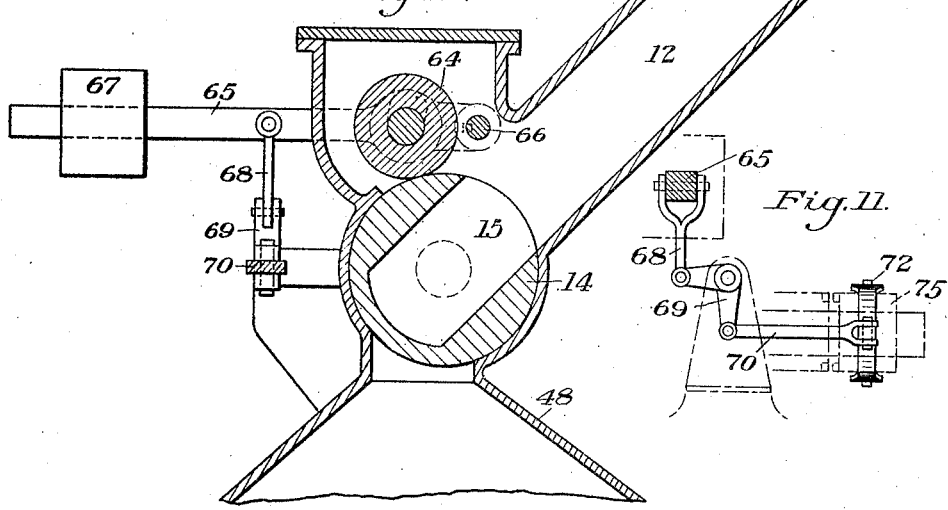
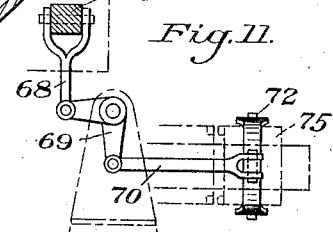
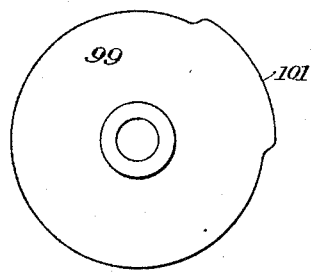
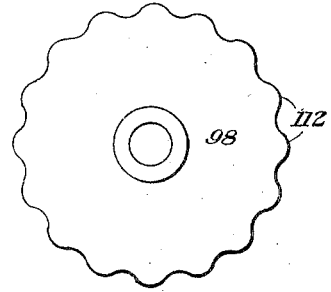
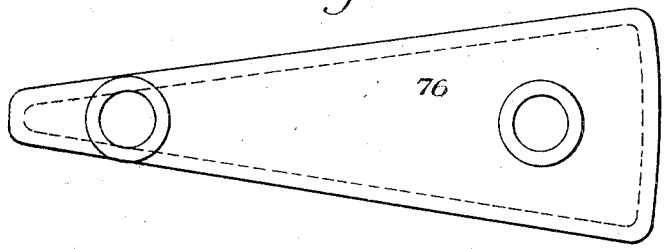

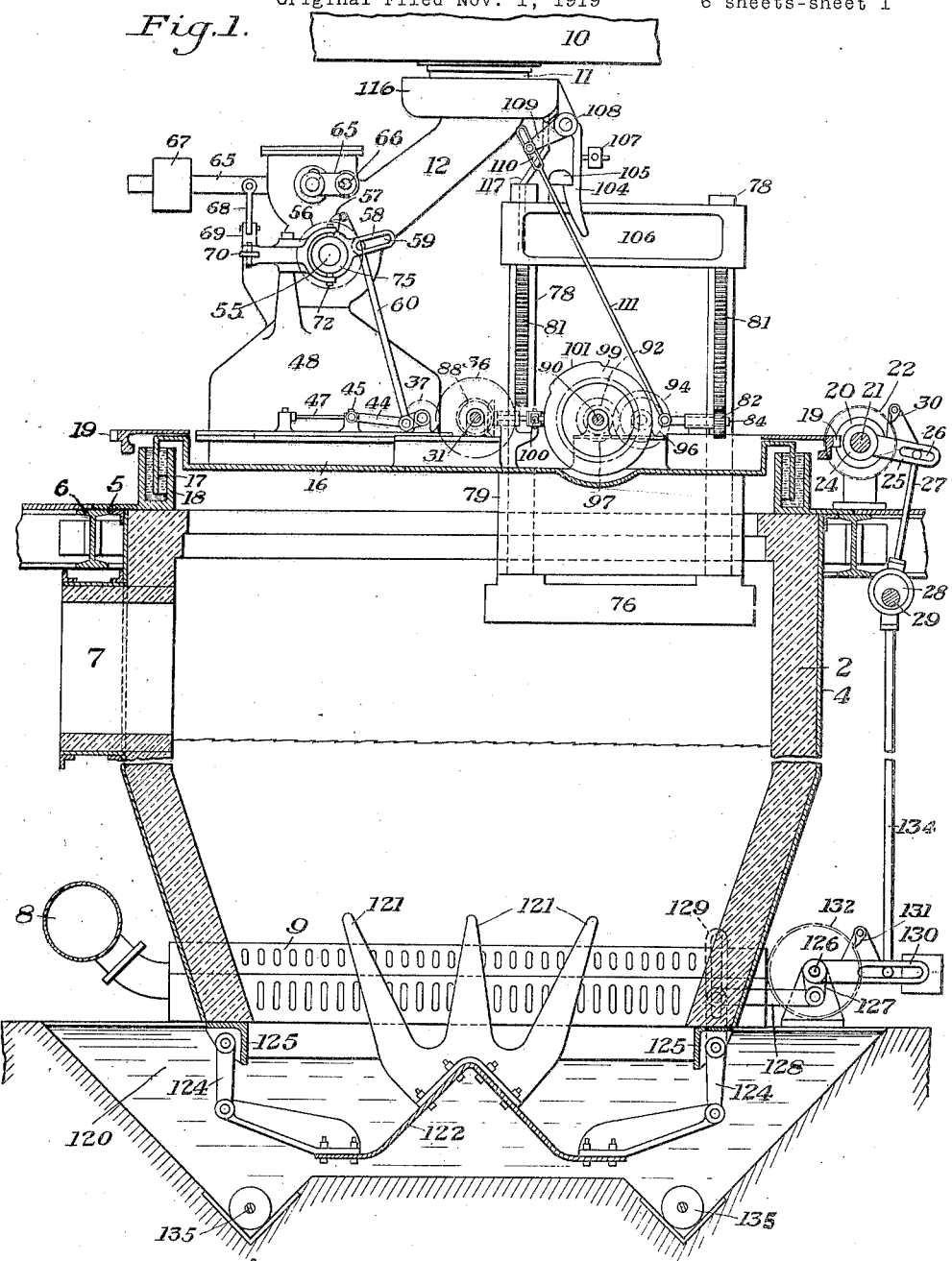

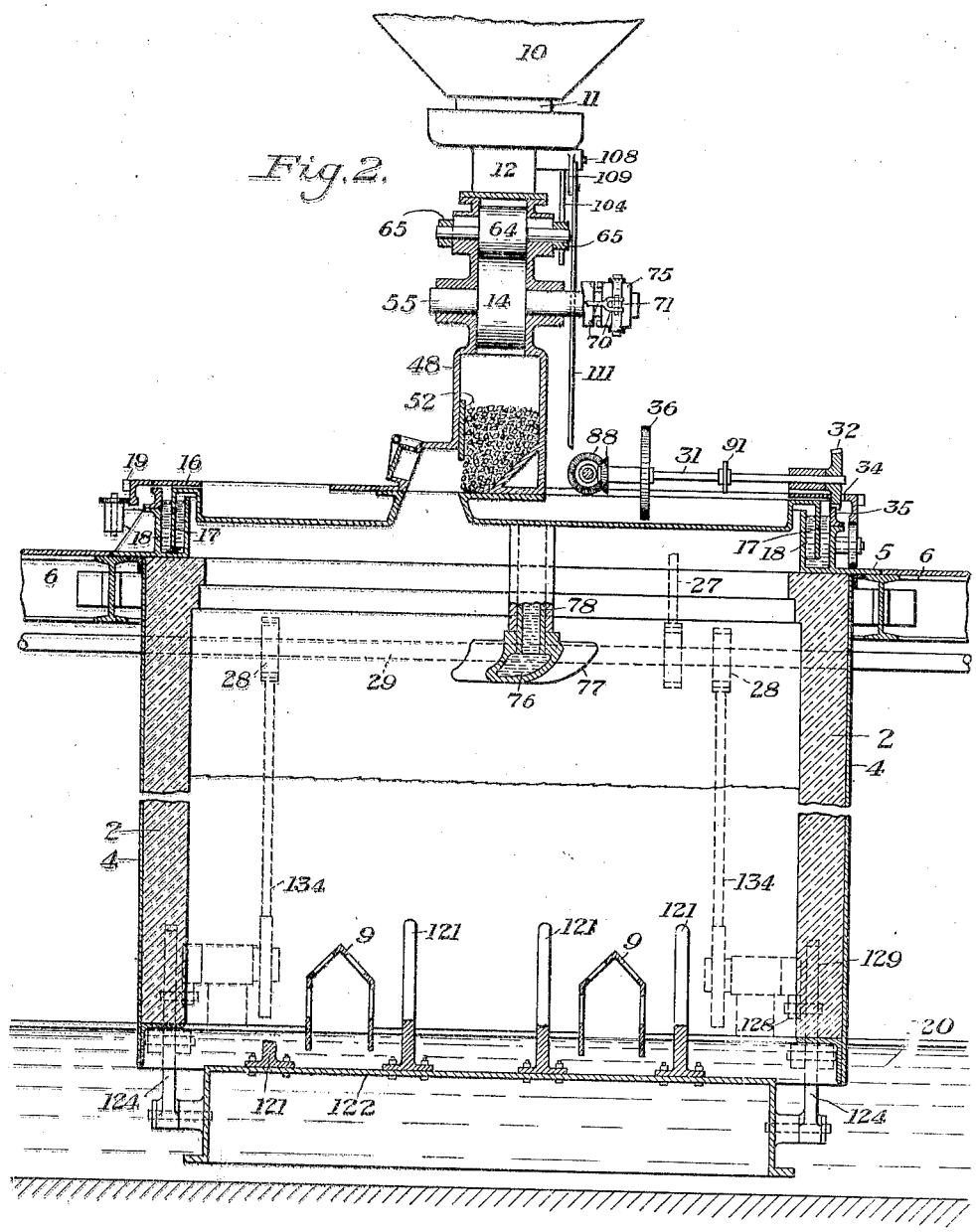

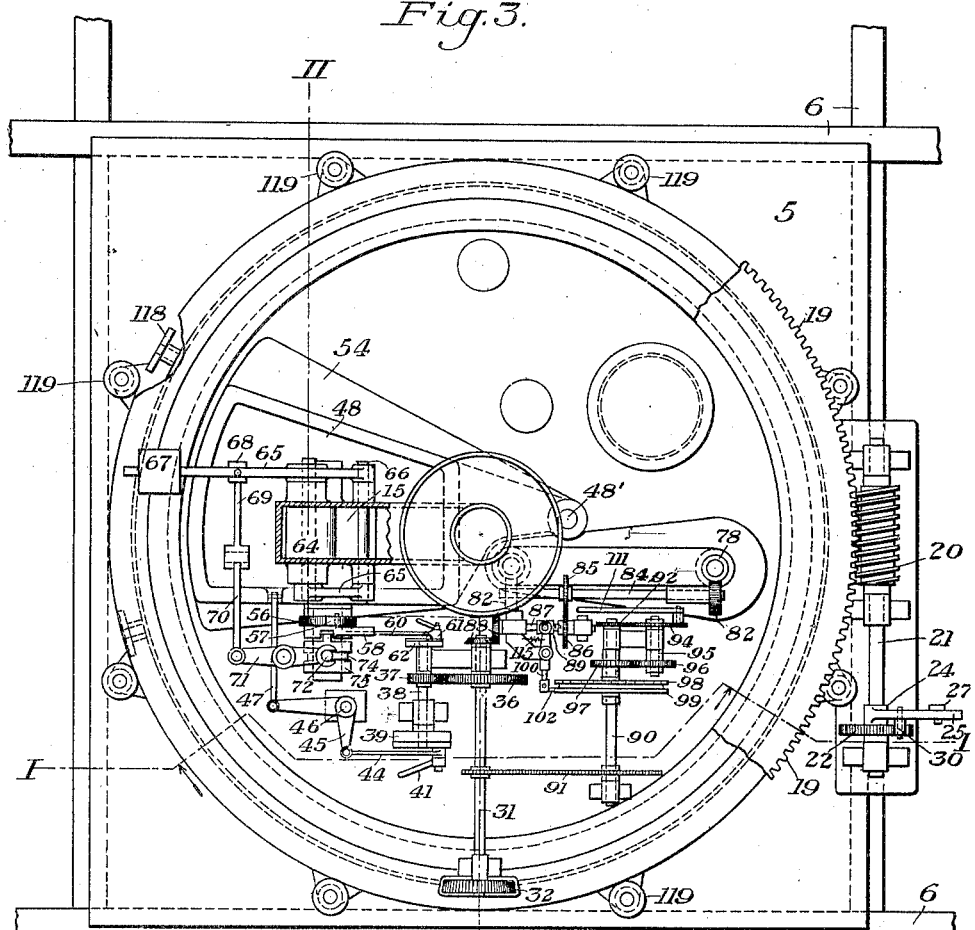
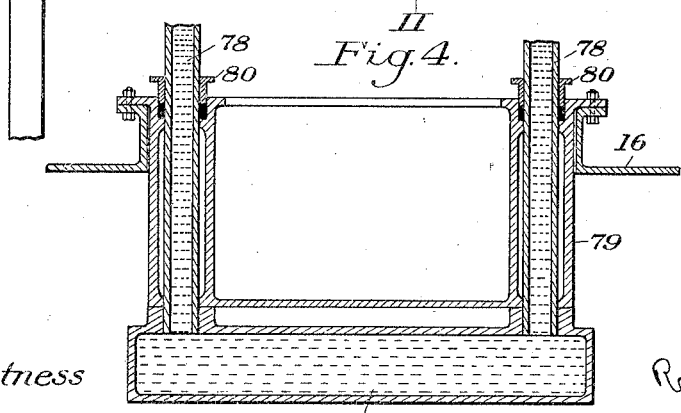

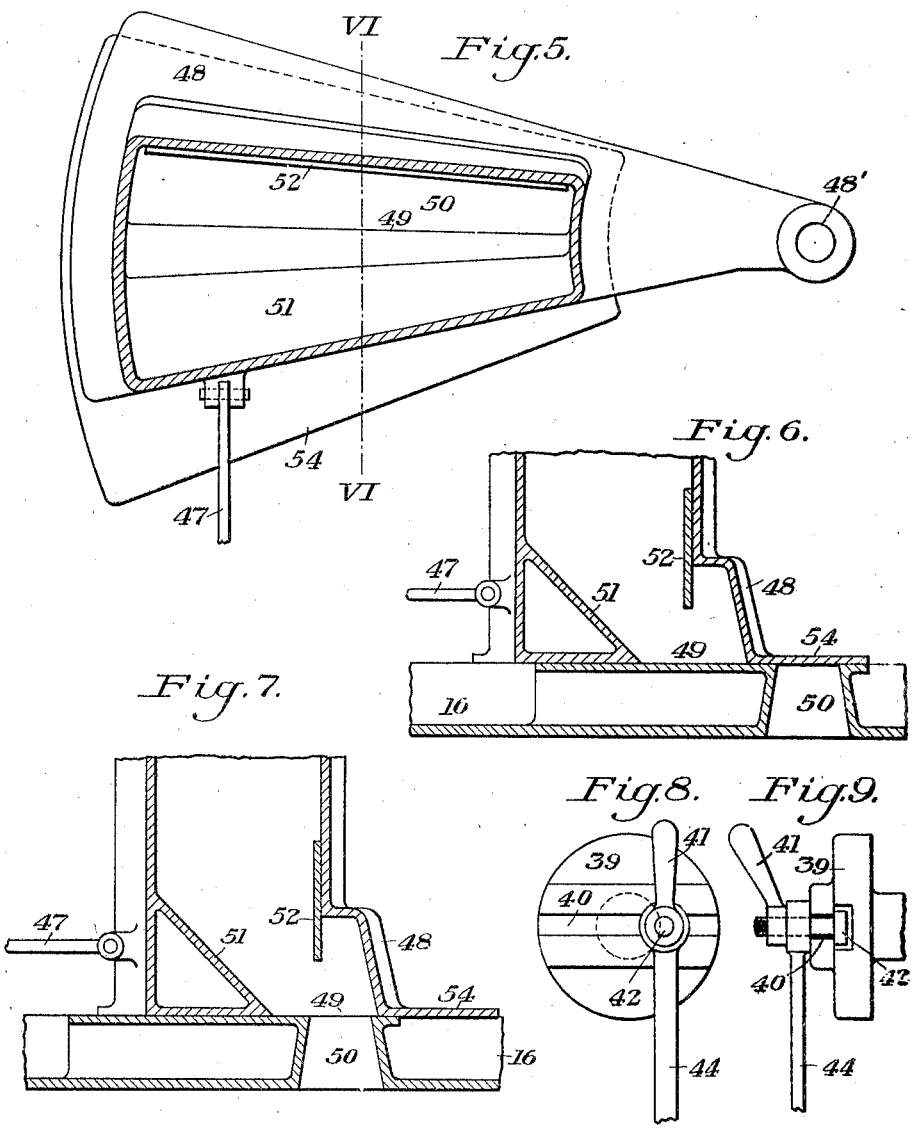

Feb. 13, 1923.

R. DAAE

GAS PRODUCER

Original Filed Nov. 1, 1919

Witness
R. H. Balderson

Inventor
Reinhardt Daae
Bakewell, Byrnes Parmelee
his Attys.

Patented Feb. 13, 1923.

1,445,300

UNITED STATES PATENT OFFICE.

REINHARDT DAAE, OF YOUNGSTOWN, OHIO.

GAS PRODUCER.

Application filed November 1, 1919, Serial No. 334,913. Renewed July 22, 1922. Serial No. 576,871.

*To all whom it may concern:*

Be it known that I, REINHARDT DAAE, a citizen of the United States, residing at Youngstown, Mahoning County, Ohio, have invented a new and useful Improvement in Gas Producers, of which the following is a full, clear, and exact description.

The present invention relates broadly to gas producers and has for its principal object a novel form of feed therefor.

Another object of the present invention is to provide a gas producer which is entirely suspended from its upper portion thereby eliminating objectionable base supports.

Still another object of this invention is to provide a novel form of poker for operating upon the coal within the producer, which poker is of special design, particularly adapting it for use in this connection.

A further object of the invention is to provide operating mechanisms for the poker which may be employed intermittently for producing different types of movements for the poker.

A still further object of the invention is to provide mechanism controlled by the position of the poker for regulating the rapidity of feed for the producer in accordance with the level of the fuel therein.

An additional object of the present invention is to provide an improved type of ash removing mechanism for the producer.

The foregoing and other objects, together with their attendant advantages, will be apparent as the invention becomes better understood by reference to the accompanying specification and drawings forming a part thereof, it being premised that changes may be made in the various details and the manner of operation within the scope of the appended claims without departing from the spirit of the invention.

Figure 1 is a sectional view approximately on the irregular line I—I of Figure 3.

Figure 2 is a sectional view on the line II—II of Figure 3.

Figure 3 is a top plan view of the producer.

Figure 4 is an enlarged detail view of a portion of the poker.

Figure 5 is an enlarged detail view partly in section of a portion of the feeding mechanism.

Figure 6 is a sectional view on the line VI—VI of Figure 5 showing a portion of the feeding mechanism in its extreme position.

Figure 7 is a view corresponding to Figure 6 illustrating a portion of the mechanism in a different position.

Figures 8 and 9 are detail views of the adjustable connection for the operating pitman.

Figure 10 is a sectional view through the feeding pocket.

Figure 11 is an enlarged detail view of a portion of the clutch operating mechanism controlled by the feed pocket.

Figure 12 is a side view of one of the poker operating cams.

Figure 13 is a side view of another of the poker operating cams for producing rapid reciprocations of the poker.

Figure 14 is a top plan view of the poker body.

Figure 15:
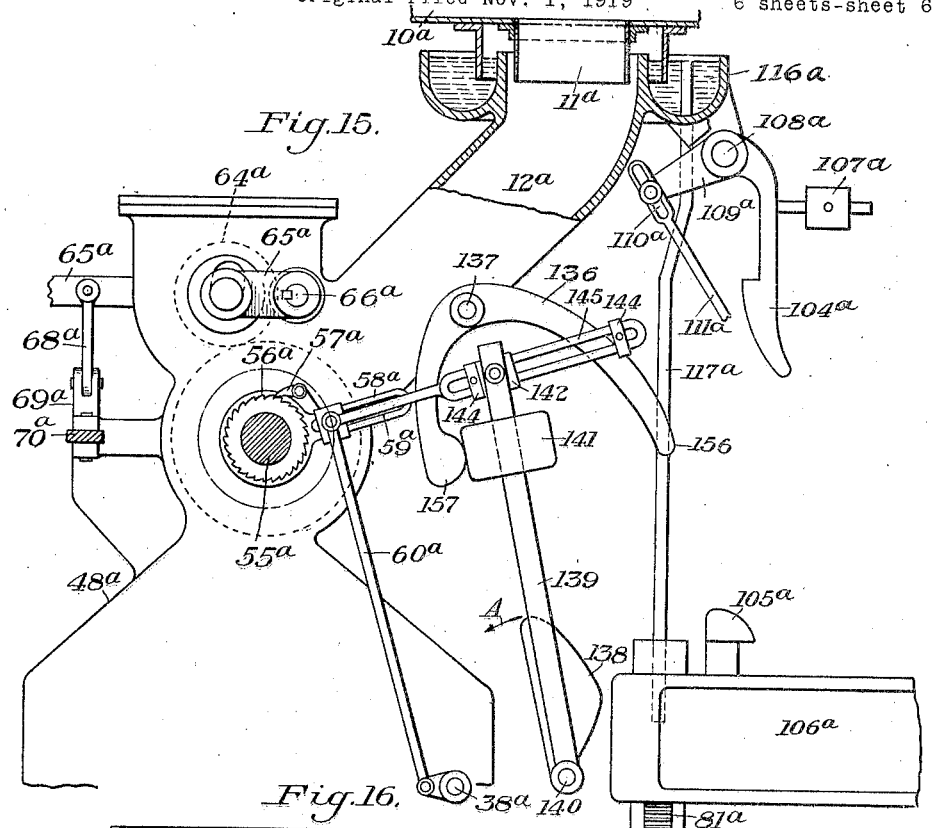
Figure 15 is a side view of a modified type of feeding mechanism.

Gas producers as heretofore constructed have ordinarily been supported entirely from below. This method of support is objectionable for the reason that it renders the removal of ashes from the bottom thereof comparatively difficult. According to the present invention the producer is entirely suspended from suitable beams thereby permitting the formation of an unrestricted ash removing space and facilitating the assembling of a series of such producers in banks or tiers all operated by a common power shaft.

Referring more particularly to the drawings, I have illustrated a producer body comprising an inner refractory lining 2 and an outer metallic casing 4 having a top plate 5. In the preferred form of construction the top plate projects beyond all sides of the producer and engages suitable structural shapes, such as I-beams 6, so that the entire producer body is suspended from the upper portion thereof.

Extending outwardly through the side wall of the producer adjacent the upper portion thereof but preferably below the supporting I-beams, is a gas offtake 7, while adjacent the bottom of the producer is an air inlet 8 feeding the perforated grate bars 9 for insuring combustion of the fuel bed within the producer.

For feeding the fuel to the producer, I have provided a novel form of mechanism illustrated as comprising a suitable hopper or source of supply 10 having a suitable outlet 11 cooperating with a chute 12 leading to the feed device. This feed device preferably comprises a cylindrical member 14 having a fuel opening 15 formed therein, the size of the opening, and the rapidity of rotation of the cylindrical member determining the amount of fuel fed to the producer, as will be more clearly explained hereinafter.

In producers of this nature, since it is necessary that the producer body be rigidly supported, the cover for the producer must be capable of rotation. This is true for the reason that the feeding device must be rotated to produce a uniform feed over the entire fuel bed within the producer body, and the poker must be operated so as to engage said fuel bed at different points throughout the entire area thereof. For permitting this operation I provide a cover 16 having a downwardly projecting portion 17 extending within the channelway 18 mounted on the upper portion of the producer and filled with water to produce the usual type of water seal. The periphery of the cover 16 is preferably provided with teeth 19 meshing with a worm 20 on the shaft 21 extending tangentially to the cover. The shaft 21 also carries a ratchet wheel 22 splined thereto and a sleeve 24 loosely mounted on the shaft and provided with an arm 25 having an opening 26 therein within which the upper end of a pitman rod 27 is adjustably connected. The lower end of the pitman rod 27 co-operates with a cam 28 formed on the main driving shaft 29. The arm 25 carries a pawl 30 co-operating with the ratchet wheel. Due to this construction it will be apparent that upon rotation of the driving shaft 29 the ratchet wheel 22 will be operated to turn the worm 20 and rotate the cover. This gearing is preferably so arranged that the cover is given a complete rotation once every six minutes.

Mounted on the cover 16 within suitable bearings and extending transversely thereof is a shaft 31 having a beveled gear 32 formed on the outer end thereof, which gear projects through an opening 34 in the cover and meshes with a rack 35 rigidly secured to the producer body in any desired manner. Adjacent the opposite end of the shaft 31 is a gear 36 meshing with a similar smaller gear 37 on the shaft 38. One end of the shaft 38 carries a disk 39 in which is formed an undercut diametrically extending groove 40, as shown more clearly in Figures 8 and 9. Extending within the groove 40 and locked therein in any desired position by the wing nut 41 is a headed bolt 42 extending through the pitman 44, having its opposite end pivotally connected to the bell crank lever 45. This bell crank lever is, in turn, provided with a pivotal mounting 46 on the cover 16 and has its free end connected by a link 47 with the casing 48 of the feed device. The casing 48 has a pivotal mounting 48' and has a bottom opening 49 co-operating with the opening 50 formed in the cover of the producer, so that as the casing is oscillated through the mechanism just described to bring the opening 49 into register with the opening 50, the charge of fuel contained within the casing 48 will be delivered into the interior of the producer body. As the cover is rotating during this period of delivery, the fuel charge will be spread evenly over a portion of the fuel bed. If desired the casing 48 may be formed with an inclined wall 51 insuring delivery of the charge of fuel carried thereby and with an adjustable gate 52 permitting the desired regulation of the fuel feed. The casing 48 is also preferably provided with a laterally extending projecting portion 54 adapted to be moved to completely close the opening 50 when it is desired to temporarily shut down the operation of the producer. This extreme movement of the casing 48 to accomplish the result just described may be procured by a suitable adjustment of the headed pin 42 within the transverse slot 40 of the disk 39. It will be apparent that fuel is delivered to the interior of the casing by means of the fuel opening 15 before described. For rotating this pocket I have provided a shaft 55 upon which the fuel pocket is mounted, and which extends outwardly through the sides of the casing 48. Loosely mounted on one end of the shaft 55 is a ratchet wheel 56 adapted to be rotated by the pawl 57 pivotally carried by the arm 58 loosely journaled on the shaft and slotted at 59 to adjustably receive the upper end of an operating pitman 60 having an adjustable connection 61 in the disk 62 carried by the one end of the shaft 38. The connection 61 with the disk 62 corresponds with the connection illustrated in detail in Figures 8 and 9. This mechanism insures rotation of the fuel pocket to feed predetermined amounts of fuel into the casing 48 as the same is oscillated or reciprocated upon the rotating cover. By changing the position of the upper end of the pitman 60 in the slot 59, the rapidity of rotation of the fuel pocket, and consequently the amount of fuel delivered, may be regulated, the entire structure operating to uniformly distribute fuel within the interior of the producer, each successive charge being started at the point of termination of the preceding charge.

It frequently happens that foreign material is carried by the fuel, which material would tend to break the apparatus in case it is not completely forced into position within the pocket 15. This is equally true of large lumps of coal. For preventing accidents of this kind I provide a crushing roller 64 rotatably mounted on the lever 65 having a pivotal connection 66 with the casing 48. The free end of the lever 65 carries a counterweight 67, while intermediate the counterweight and the pivotal mounting there is provided a bifurcated link 68 connected at its upper end with the lever 65 and at its lower end with the pivotally mounted bell crank lever 69. This bell crank lever 69 has a link connection 70 with a pivotally mounted clutch operating member 71. The member 71 is provided with pins 72 projecting inwardly from the bifurcations formed on the end of the member, and co-operating with a peripheral groove 74 in the clutch member 75 which is normally in engagement with the ratchet wheel 56 to insure rotation of the feed pocket. When a piece of metal, or a large lump of coal is fed through the chute 12 into the pocket 15, but projects beyond the periphery of the cylindrical member 14, it will be brought into engagement with the roller 64. This will result in lifting the roller 64 and disengaging the clutch member 75 from the driving ratchet 56 through the mechanism described. The counterweight 67 will effect a return of the roller 64 into engagement with the periphery of the cylindrical member 14 thereby producing a retrograde movement of the feeding pocket. This will also result in a reengagement of the clutch member 75 with the driving ratchet 56 for feeding the pocket forwardly again. This operation will continue until the piece of metal or lump of coal is broken or forced entirely into the pocket 15.

Co-operating with the feed device for leveling and packing the fuel within the body of the gas producer, I have provided a novel type of poker and actuating mechanism therefor. This comprises, in its preferred embodiment, a main hollow body 76 gradually increasing in cross-section from one end toward the other so that the area of fuel affected by the poker on each operation increases toward the outer portion of the producer. The forward face of the body 76 is preferably inclined or curved, as indicated at 77, to facilitate the packing and smoothing operation as will be more fully apparent hereinafter. Connected to each end of the body 76 is a hollow upright 78 extending through suitable journals in the casting 79 carried by the cover 16. Co-operating with each of the uprights 78 to form a tight packing to prevent the escape of gas from the producer is a suitable packing gland 80. At their upper ends the uprights 78 are provided with racks 81 in engagement with gears 82 on the transverse shaft 84. The shaft 84 is adapted to be periodically driven through the gear 85 rigidly mounted thereon and meshing with a similar gear 86 loosely mounted on a stud shaft 87, receiving power in turn from the shaft 31 and beveled gears 88. Through the gearing described, the poker will be periodically elevated when the clutch member 89 which is splined to the shaft 87, is forced into engagement with the hub of the gear 86. For accomplishing this clutching engagement I have provided a second shaft 90, extending parallel to the shaft 31 and receiving power therefrom through the reduction gearing and sprocket chain 91. At one end the shaft 90 is provided with a small gear 92 meshing with a larger gear 94 on the stud shaft 95. The opposite end of the shaft 95 carries a spur gear 96 meshing with a similar gear 97 splined to the shaft 90 and driving the cams 98 and 99, either of which may be employed at will to operate the pivoted member 100 for throwing the clutch 89 into driving engagement with the gear 86. As before described, the cover of the producer is adapted to make approximately one revolution every six minutes. Due to the reduction gearing provided, the gear 94, and consequently the cams 98 and 99, are each adapted to make substantially half a revolution to one complete revolution of the cover 16. The cam 99 has an operating projection 101 formed on the periphery thereof and extending through an arc of substantially 60°. When the projection 101 comes into engagement with the adjustable arm 102 on the end of the clutch operating lever 100, the gearing will be set in motion to elevate the poker from its lower position in engagement with the fuel bed. In some instances, it is desirable that the poker remain in its lower position for substantially a complete revolution of the producer cover so that the entire upper surface of the fuel bed is acted upon thereby. When raised to its upper position it is held by a latch 104 passing under the lug 105 on the crosshead 106 joining the uprights 78. A counterweight 107 is formed on the latch 104 so as to normally swing the same about its pivotal mounting 108 to effect the engagement described. For operating the latch to drop the poker I have provided an arm 109 having a pin in engagement with the slotted portion 110 of the link 111 secured eccentrically of the gear 94. Due to the fact that the gear 94 makes one-half a revolution for each revolution of the cover, it will be apparent that the latch is released once for every two complete revolutions of the cover. This operation has been found to be very successful, as the gear 94 operates to drop the poker to its lower position where it remains for one complete revolution of the cover after which the projection 101 comes into engagement with the arm 102 which operates the poker lifting mechanism so that the poker is permitted to remain in its upper position for the next revolution of the cover. As long as the cam 99 is employed this operation will be repeated. It will be apparent that the inclined face 77 formed on the poker body 76 permits the same to ride over and smooth out irregularities in the fuel bed. At times however, it may be advantageous to subject the fuel bed to a series of successive poker impulses occurring in rapid succession. For producing this action I employ the cam 98 which has a series of peripheral projections 112 adapted to engage the arm 102, which may be adjusted along the clutch operating member 100 by loosening the set screw 114. When this cam is employed it will be apparent that the lifting mechanism for the poker is thrown into and out of operation in rapid succession so that the poker is lifted a slight distance, is dropped and then lifted again, this operation continuing as long as the cam 98 is being utilized. A spring 115 may be provided for returning the clutch member 100 to neutral position. The particular shape of the poker, before described, insures a uniform packing of the fuel under these rapid poker impulses, the outer body of the bed securing substantially the same amount of packing as the inner portion thereof so that the entire fuel bed is placed in a uniform condition.

For keeping the poker cool during this operation I preferably supply the interior thereof through the uprights 78 with water which may be received from the water seal 116 provided on the chute 12 through the overflow connection 117 adapted to telescopically slide within one of the uprights 78. The other upright may be in turn connected with any suitable discharge.

For supporting the cover 16 during rotation thereof, I may provide a series of antifriction rollers 118 and for preventing lateral movement thereof I may provide a second series of antifriction rollers 119 mounted in any desired manner to perform these functions.

By suspending the producer body in the manner described, I am enabled to provide a water-seal 120 for the entire body of the producer. Working within the body of the water constituting this seal 120 and extending upwardly between the grate bars 9, I have provided ash removing fingers 121 preferably supported on a base 122 swingingly supported on the links 124 pivoted to the flange 125 formed on the base of the producer. For operating these fingers to produce the desired removal of ashes there may be provided a shaft 126 formed with a crank 127 having a link connection 128 with the slotted upper end 129 of an arm suitably secured to one of the links 124. For rotating the shaft 126 to oscillate the ash removing fingers, I have illustrated an arm 130 loosely journaled on the shaft and carrying a pivoted pawl 131 adapted to engage the teeth on the ratchet wheel 132 splined on the shaft 126. The outer end of the arm is slotted to adjustably receive the lower end of a pitman 134 co-operating with the cam 28 on the main shaft 29, so that rotation of the shaft will produce the desired operation of the ash removing fingers.

Within the water seal I may also provide suitable conveying devices 135 for removing the ashes from below the producer.

Figure 16:
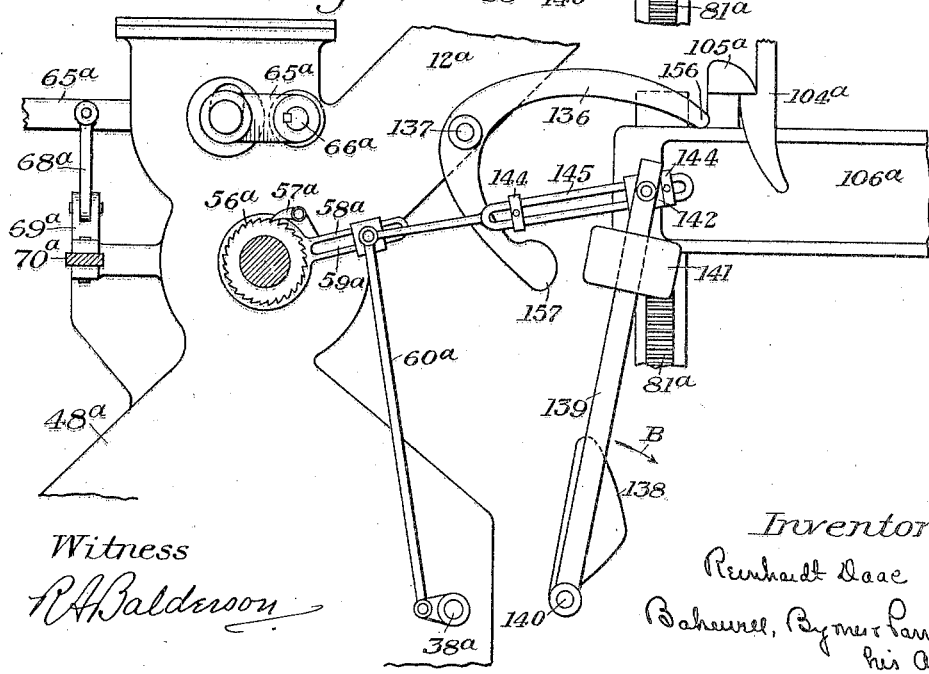
Figure 16 is a side view corresponding to Figure 15, showing the poker in its up position.

Referring more particularly to Figures 15 and 16, in which I have indicated the parts already described in connection with the preceding figures by the same reference characters having the letter $a$ added thereto, I have illustrated an attachment by means of which the position of the poker will determine the rapidity of feed of fuel to the producer. This means, as illustrated, comprises a U-shaped trigger member 136 pivotally supported at 137 on the chute 12$^a$. With the poker in its lowermost position it is obvious that more fuel should be fed to the interior of the producer. When this condition occurs the crosshead 106$^a$ will engage the cam 138 secured to the arm 139 having a suitable pivotal support 140, and swing the same in the direction of the arrow A. The upper end of the lever 139 carries a weight 141 and has a collar 142 adapted to operate between the fixed stops 144 mounted on the arm 145, the inner end of which is suitably secured to the upper end of the link 60$^a$. When the cam 138 is thrown in the direction of the arrow A, the upper end of the link 60$^a$ will be forced to its extreme inner position in the slotted end 59$^a$ of the arm 58$^a$, so that as the link 60$^a$ is reciprocated it will impart a greater degree of rotation to the fuel feeding device 14. On the other hand, when the poker is in its extreme upper position, it may be desired to restrict the feed of fuel. This is accomplished by the engagement of the crosshead 106$^a$ with the end 156 of the lever 136, thereby lifting the same and swinging the cam 138 and its associated mechanism in the direction of the arrow B by the action of the end 157 of the lever on the weight 141. In this position, as shown more clearly in Figure 16, the upper end of the link 60$^a$ will be drawn to its outermost position in the slot 59$^a$ thereby causing it to impart a comparatively small rotative movement to the fuel feeding devices.

Certain features of the present invention relating more particularly to the poker and its operating mechanism, are claimed in my co-pending application Serial No. 416,013, filed October 11, 1920.

The advantages of my invention arise from a construction in which the entire body of the producer is suspended, thereby permitting free access to the interior thereof from below the same, as well as from the improved fuel feeding device and ash removing device co-operating with the poker in the manner described.

It will, of course, be apparent that the present invention depends for its successful operation only on the production of a relative movement between the producer cover and the producer body, the same results being produced whether the body or the cover is rotated.

Also, it will be obvious that due to the construction and operation of the feed casing 48, a greater amount of fuel is fed into the producer adjacent the outer portions thereof, than is fed to the inner portions, this difference in amount varying gradually throughout the length of the feed opening 50.

I claim:

1. In a gas producer, a cover having a feed opening therethrough, a casing above said opening, a cylindrical member in said casing having a fuel pocket, means for feeding fuel into said pocket, means for rotating said member, and means co-operating with said member for rendering the rotating means therefor ineffective when the material within the pocket projects beyond the edges thereof, substantially as described.

2. In a gas producer, a cover having a feed opening therethrough, a casing above said opening, a cylindrical member in said casing having a fuel pocket, means for feeding fuel into said pocket, means for rotating said member, and a roller co-operating with said member for rendering the rotating means therefor ineffective when the material within the pocket projects beyond the edges thereof, substantially as described.

3. In a gas producer, a cover having a feed opening therethrough, a casing above said opening, a cylindrical member in said casing having a fuel pocket, means for feeding fuel into said pocket, means for rotating said member, and means co-operating with said member for rendering the rotating means therefor ineffective when the material within the pocket projects beyond the edges thereof, together with means for automatically rendering said rotating means effective when said material is properly positioned within said pocket, substantially as described.

4. In a gas producer, a cover having a feed opening therethrough, a casing above said opening, a cylindrical member in said casing having a fuel pocket, means for feeding fuel into said pocket, driving mechanism for rotating said member, a clutch for connecting and disconnecting said driving mechanism, and means co-operating with said member during rotation thereof for disengaging said clutch when the material within the pocket projects beyond the edges thereof, substantially as described.

5. In a gas producer, a cover having a feed opening therethrough, a casing above said opening, a cylindrical member in said casing having a fuel pocket, means for feeding fuel into said pocket, driving mechanism for rotating said member, a clutch for connecting and disconnecting said driving mechanism, means co-operating with said member during rotation thereof for disengaging said clutch when the material within the pocket projects beyond the edges thereof, and means for automatically re-engaging said clutch when said material is properly positioned within said pocket, substantially as described.

6. In a gas producer, a cover having a feed opening therethrough, a casing above said opening, a rotatable member within said casing having a fuel pocket, means for rotating said member, means for feeding fuel into said pocket, and a weighted roller co-operating with said member for forcing the fuel into said pocket, substantially as described.

7. In a gas producer, a cover having a feed opening therethrough, a casing above said opening, means for producing a relative rotational movement between said cover and casing and the producer, means for automatically oscillating said casing independently of said cover across said opening, and means for feeding fuel into said casing, substantially as described.

8. In a gas producer, a rotatable cover therefor, a casing carried by said cover for feeding fuel to the producer, a rotatable member in said casing having a fuel pocket therein, means for feeding fuel into said pocket, means for rotating said member for emptying the fuel from said pocket, and means for automatically varying the speed of rotation of said member as the level of the fuel in the producer varies, substantially as described.

9. In a gas producer, a cover having a feed opening therethrough, a feed casing carried by said cover, means for feeding fuel to said casing, means for oscillating said casing above said opening for intermittently delivering fuel therethrough, and a projection on said casing, said means being adjustable at will for moving said projection to cover said opening, substantially as described.

10. In a gas producer having a cover, a casing carried by said cover for feeding fuel to the producer, a member in said casing having a fuel pocket therein, means for feeding fuel into said pocket, said member forming a sealing closure between the producer and said means, means for operating said member for emptying the fuel from said pocket into the producer, and means for automatically varying the speed of operation of said member as the level of the fuel bed within the producer varies, substantially as described.

11. In a gas producer, a cover having a feed opening therethrough, a casing above said opening, a member in said casing having a fuel pocket, means for feeding fuel into said pocket, means for operating said member, and means co-operating with said member for rendering the operating means therefor ineffective when the material within the pocket projects beyond the edges thereof, substantially as described.

12. In a gas producer, a cover having a feed opening therethrough, a casing above said opening, a member in said casing having a fuel pocket, means for feeding fuel into said pocket, means for operating said member to discharge the fuel from said pocket, and a roller co-operating with said member for rendering the operating means therefor ineffective when the material within the pocket projects beyond the edges thereof, substantially as described.

13. In a gas producer, having a cover, a casing carried by said cover for feeding fuel to the producer, a movable member in said casing having a fuel pocket therein, means for feeding fuel into said pocket, means for moving said member for emptying the fuel from said pocket, a poker, and means controlled by the position of said poker for automatically varying the speed of movement of said member, substantially as described.

14. In a gas producer, a cover having a feed opening therethrough, a feed casing carried by said cover, means for feeding fuel to said casing, mechanical means for oscillating said casing above said opening through a predetermined distance for intermittently delivering fuel therethrough, and a projection on said casing, said means being adjustable at will for increasing the movement of said casing for bringing the projection thereon over said opening, substantially as described.

15. A gas producer having a pivoted sliding feed device, and means for oscillating said device to feed a greater amount of fuel adjacent the outer portions of said producer than adjacent the inner portions thereof, substantially as described.

16. A gas producer having a pivoted sliding feed device, and means for oscillating said device to feed gradually increasing amounts of fuel from the center of said producer outwardly therefrom during the operation of said device, substantially as described.

17. A gas producer having a pivoted sliding feed device, means for intermittently oscillating said device to feed a greater amount of fuel adjacent the outer portions of the producer than adjacent the inner portions thereof, and means for delivering fuel to said device, substantially as described.

18. A gas producer, comprising a cover having a substantially radially extending opening therethrough, a pivoted sliding feed device cooperating with said opening, means for delivering fuel to said device, and means for oscillating said device to feed gradually increasing amounts of fuel from the center of the producer outwardly therefrom, substantially as described.

19. In a gas producer, a cover having a substantially radially extending opening therethrough, a pivoted feed device cooperating with said opening, and means for oscillating said device to feed gradually increasing amounts of fuel from the center of the producer outwardly therefrom, said means being adjustable to vary the movement of said device, substantially as described.

20. In a gas producer, a cover, means for producing relative movement between said producer and said cover, a casing carried by said cover for feeding fuel to the producer, a rotatable member in said casing having a fuel pocket therein, means for feeding fuel to said pocket, an arm for rotating said member for emptying the fuel from said pocket into the producer, an actuating lever adjustably cooperating with said arm, and a poker carried by said cover and adapted to engage said lever for adjusting the same with respect to said arm for varying the speed of rotation of said member as the position of the poker is varied by changes in the level of the fuel bed within the producer.

In testimony whereof, I have hereunto set my hand.

REINHARDT DAAE.